US011195048B2

(12) United States Patent
Bui et al.

(10) Patent No.: US 11,195,048 B2
(45) Date of Patent: Dec. 7, 2021

(54) GENERATING DESCRIPTIONS OF IMAGE RELATIONSHIPS

(71) Applicant: Adobe Inc., San Jose, CA (US)

(72) Inventors: Trung Huu Bui, San Jose, CA (US); Zhe Lin, Fremont, CA (US); Hao Tan, Durham, NC (US); Franck Dernoncourt, Sunnyvale, CA (US); Mohit Bansal, Carrboro, NC (US)

(73) Assignees: Adobe Inc., San Jose, CA (US); The University Of North Carolina At Chapel Hill, Chapel Hill, NC (US)

( * ) Notice: Subject to any disclaimer, the term of this patent is extended or adjusted under 35 U.S.C. 154(b) by 163 days.

(21) Appl. No.: 16/750,478

(22) Filed: Jan. 23, 2020

(65) Prior Publication Data

US 2021/0232850 A1    Jul. 29, 2021

(51) Int. Cl.
*G06K 9/62* (2006.01)
*G06F 40/10* (2020.01)
*G06K 9/46* (2006.01)

(52) U.S. Cl.
CPC .......... *G06K 9/6202* (2013.01); *G06F 40/10* (2020.01); *G06K 9/4604* (2013.01); *G06K 9/6215* (2013.01)

(58) Field of Classification Search
CPC .......... G06K 9/00718; G06K 9/00744; G06K 9/00765; G10L 15/1822; G10L 21/007; G10L 25/09; G10L 25/21; G10L 25/24; G10L 25/30; G11B 27/036; G11B 27/3081; G11B 27/34; H04N 21/23418; H04N 21/23424; H04N 21/812
See application file for complete search history.

(56) References Cited

U.S. PATENT DOCUMENTS

2019/0278844 A1*    9/2019    Brixey ................ G06F 3/04842

OTHER PUBLICATIONS

"Automatic Photography with Google Clips", Retrieved at https://ai.googleblog.com/2018/05/automatic-photography-with-google-clips.html, May 11, 2019, 6 pages.
Agrawal,"VQA: Visual Question Answering", Oct. 27, 2016, 25 pages.
Anderson,"Bottom-Up and Top-Down Attention for Image Captioning and Visual Question Answering", Aug. 10, 2017, 15 pages.
Andreas,"Reasoning about Pragmatics with Neural Listeners and Speakers", Sep. 26, 2016, 10 pages.
Bahdanau,"Neural Machine Translation by Jointly Learning To Align And Translate", In Journal of Computing Research Repository, Sep. 2014, 15 pages.

(Continued)

*Primary Examiner* — Manuchehr Rahmjoo
(74) *Attorney, Agent, or Firm* — FIG. 1 Patents

(57) ABSTRACT

In implementations of generating descriptions of image relationships, a computing device implements a description system which receives a source digital image and a target digital image. The description system generates a source feature sequence from the source digital image and a target feature sequence from the target digital image. A visual relationship between the source digital image and the target digital image is determined by using cross-attention between the source feature sequence and the target feature sequence. The system generates a description of a visual transformation between the source digital image and the target digital image based on the visual relationship.

20 Claims, 9 Drawing Sheets

(56) References Cited

OTHER PUBLICATIONS

Banerjee,"METEOR: An Automatic Metric for MT Evaluation with Improved Correlation with Human Judgments", Jan. 2005, 8 pages.
Celikyilmaz,"Deep Communicating Agents for Abstractive Summarization", Aug. 15, 2018, 14 pages.
Chen,"Language-Based Image Editing with Recurrent Attentive Models", Jun. 10, 2018, 12 pages.
Cohn-Gordon,"Pragmatically Informative Image Captioning with Character-Level Inference", May 10, 2018, 5 pages.
Farhadi,"Every Picture Tells a Story: Generating Sentences from Images", Sep. 2010, 14 pages.
He,"Deep Residual Learning for Image Recognition", Proceedings of the IEEE conference on computer vision and pattern recognition, 2016., Dec. 10, 2015, 12 pages.
Jain,"Creativity: Generating Diverse Questions using Variational Autoencoders", Apr. 11, 2017, 10 pages.
Jhamtani,"Learning to Describe Differences Between Pairs of Similar Images", Oct. 31, 2018, pp. 4024-4034.
Johnson,"CLEVR: A Diagnostic Dataset for Compositional Language and Elementary Visual Reasoning", Dec. 20, 2016, 17 pages.
Kazemzadeh,"ReferItGame: Referring to Objects in Photographs of Natural Scenes", Jan. 1, 2014, 12 pages.
Kilickaya,"Re-evaluating Automatic Metrics for Image Captioning", In Proceedings of the 15th Conference of the European Chapter of the Association for Computational Linguistics: vol. 1, Apr. 2017, pp. 199-209.
Krishna,"Visual genome: Connecting language and vision using crowdsourced dense image annotations", Feb. 23, 2016, 44 pages.
Kulkarni,"BabyTalk: Understanding and Generating Image Descriptions", Jan. 2011, pp. 1601-1608.
Li,"Visual Question Generation as Dual Task of Visual Question Answering", Sep. 21, 2017, 9 pages.
Lin,"Microsoft COCO: Common Objects in Context", Computer Vision and Pattern Recognition, May 1, 2014, 16 pages.
Lin,"ROUGE: A Package for Automatic Evaluation of Summaries", Jul. 25, 2004, 8 pages.
Liu,"Improved Image Captioning via Policy Gradient optimization of SPIDEr", Mar. 18, 2017, 12 pages.
Liu,"Referring Expression Generation and Comprehension via Attributes", Oct. 2017, 9 pages.
Luo,"Discriminability objective fortraining descriptive captions", Jun. 8, 2018, 14 pages.
Manjunatha,"Learning to Color from Language", Apr. 17, 2018, 6 pages.
Mao,"Generation and Comprehension of Unambiguous Object Descriptions", Apr. 11, 2016, 11 pages.
Misra,"Learning by Asking Questions", Dec. 4, 2017, 14 pages.
Mori,"Image-to-word Transformation Based on Dividing and Vector Quantizing Images with Words", Nov. 1999, 9 pages.
Pan,"Hierarchical Recurrent Neural Encoder for Video Representation with Application to Captioning", Nov. 11, 2015, 10 pages.
Papineni,"BLEU: A Method for Automatic Evaluation of Machine Translation", Proceedings of the 40th Annual Meeting of the Association for Computational Linguistics (ACL), Jul. 2002, pp. 311-318.
Pasunuru,"Reinforced Video Captioning with Entailment Rewards", Aug. 7, 2017, 9 pages.
Plummer,"Flickr30k Entities: Collecting Region-to-Phrase Correspondences for Richer Image-to-Sentence Models", Jan. 2015, pp. 2641-2649.
Ranzato,"Sequence Level Training with Recurrent Neural Networks", May 6, 2016, 16 pages.
Rennie,"Self-critical Sequence Training for Image Captioning", Nov. 16, 2017, 16 pages.
Suhr,"A Corpus for Reasoning About Natural Language Grounded in Photographs", Jul. 21, 2019, 22 pages.
Vaswani,"Attention Is All You Need", Dec. 6, 2017, 15 pages.
Vedantam,"CIDEr: Consensus-based Image Description Evaluation", Jun. 3, 2015, 17 pages.
Vedantam,"Context-aware Captions from Context-agnostic Supervision", Jul. 31, 2017, 15 pages.
Venugopalan,"Sequence to Sequence—Video to Text", Dec. 7, 2015, pp. 4534-4542.
Vinyals,"Show and Tell: A Neural Image Caption Generator", Apr. 20, 2015, 9 pages.
Wang,"Learning to Globally Edit Images with Textual Description", Oct. 13, 2018, 21 pages.
Xu,"MSR-VTT: A Large Video Description Dataset for Bridging Video and Language", Jun. 1, 2019, 9 pages.
Xu,"Show, Attend and Tell: Neural Image Caption Generation with Visual Attention", Apr. 19, 2016, 22 pages.
Yu,"A Joint Speaker-Listener-Reinforcer Model for Referring Expressions", Apr. 17, 2017, 11 pages.
Zhu,"Visual7W: Grounded Question Answering in Images", Apr. 9, 2016, 10 pages.

* cited by examiner

GENERATING DESCRIPTIONS OF IMAGE RELATIONSHIPS

BACKGROUND

Automatically generating natural language descriptions of digital images (hereinafter also referred to as "images") has attracted significant interest due to its practical applications in image searching, photograph curation, and assisting visually impaired persons. Conventional systems have achieved promising results in single-image captioning such that a trained machine learning model can receive a digital image and generate a natural language description of a feature or features depicted in the image. Thus, conventional single-image captioning systems can determine which objects are depicted in a given image and also express some information about the objects in a natural language.

However, image pair captioning, especially the task of describing relationships and differences between two digital images is more challenging. This is because multiple image captioning involves solving an additional problem of determining how objects depicted in one image are related to objects depicted in another image. As a result of this added challenge, conventional systems for generating descriptions of digital image pairs are designed for and limited to performing tasks that are dataset specific.

These systems rely on techniques which are highly specific to a particular dataset such as preprocessing of images using masking and clustering to approximate object-level differences in the images of the particular dataset. Rather than solving the additional problem associated with multiple image captioning, conventional systems simply avoid the problem by preprocessing the particular dataset. Consequently, these systems are unable to address multiple digital image datasets or to support tasks involving multiple digital images and the relationships between these images.

SUMMARY

Systems and techniques are described for generating descriptions of image relationships. In an example, a computing device implements a description system to generate a description of a visual transformation between a source image and a target image. In one example, the description system generates feature maps of the source and target images and then flattens the feature maps into a source feature sequence corresponding to the source image and a target feature sequence corresponding to the target image. Features of the source feature sequence each represent a portion of the source digital image and features of the target feature sequence each represent a portion of the target digital image.

The description system then uses cross-attention between the features of the source feature sequence and the features of the target feature sequence to determine a visual relationship between the source image and the target image, automatically and without user intervention. From this, the description system generates the description of the visual transformation between the source and target images based on the visual relationship. The system renders the description in natural language (e.g., as text, audio, etc.) in a user interface of a display device.

By using cross-attention to focus on all of the visual correlations between the digital images rather than focusing on localized relationships, the described systems and techniques can generate multiple types of descriptions of digital image pairs including descriptions of image editing operations, descriptions of differences between digital images, and descriptions of objects depicted in the digital images. The systems can generate these descriptions across multiple different digital image datasets and are therefore not dataset specific, unlike conventional systems. The described systems also demonstrate improved performance relative to conventional systems based on multiple different evaluation metrics and thus improve accuracy and efficiency of usage of computational resources over conventional techniques that are incapable of realizing this functionality.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures. Entities represented in the figures may be indicative of one or more entities and thus reference may be made interchangeably to single or plural forms of the entities in the discussion.

DETAILED DESCRIPTION

Overview

Figure 1:
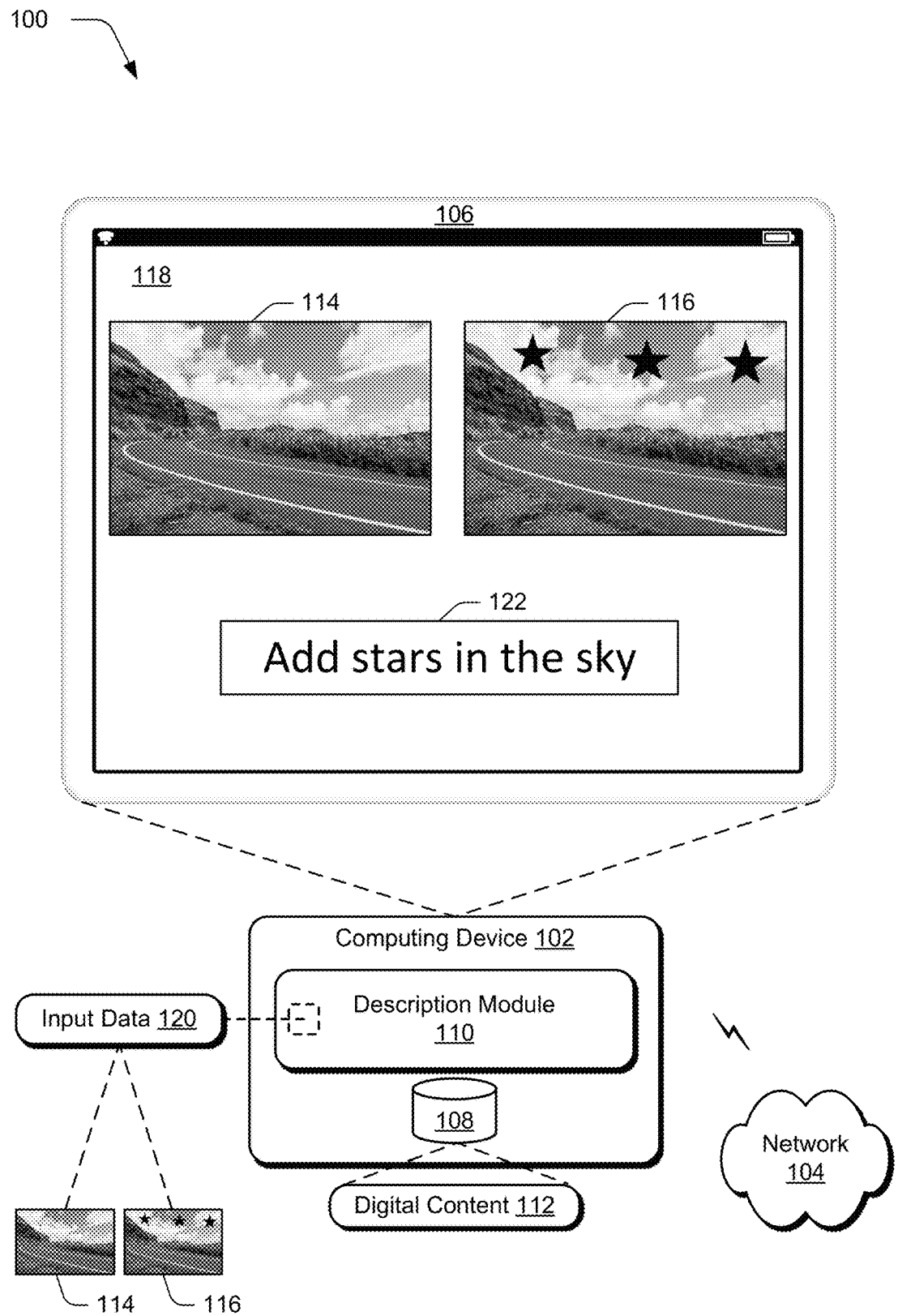
FIG. 1 is an illustration of an environment in an example implementation that is operable to employ digital systems and techniques as described herein.

Conventional systems for generating descriptions of pairs of digital images are designed for use on a particular digital image dataset. These systems rely on the nature of the particular dataset such as by preprocessing images of the particular data set to generate descriptions of localized relationships which are explicitly identifiable. As a result, conventional systems and techniques are not suited for generating descriptions of pairs of digital images using image datasets which include diverse, detailed, and/or implicit relationships between the pairs of digital images.

Systems and techniques are described for generating descriptions of image relationships. In one example, a computing device implements a description system which receives a source image and a target image. The description system generates a source feature map corresponding to the source image and a target feature map corresponding to the target image. The system then flattens the feature maps into a source feature sequence corresponding to the source image and a target feature sequence corresponding to the target image. For example, features of the source feature sequence each represent a portion of the source image and features of the target feature sequence each represent a portion of the target image.

The system uses cross-attention between the features of the source feature sequence and the features of the target feature sequence to focus on all of the visual relationships depicted in the source and target images. This cross-attention is bi-directional relational attention considered from the source features to the target features and considered from the target features to the source features. In this way, the described system is usable on digital image datasets which can include image pairs having non-localized visual relationships. Thus, the described system is general and not dependent on any specific image dataset.

A visual relationship between the source image and the target image is determined using the cross-attention between the source feature sequence and the target feature sequence. In one example, this visual relationship is determined by calculating visual alignment while decoding. The system generates a natural language description of a visual transformation between the source image and the target image based on the visual relationship. This natural language description can be of an image editing operation performed on the source image to generate the target image, a difference between the source image and the target image, objects or features depicted in the source image or the target image, and so forth.

By directly modeling visual relationships using the cross-attention between the source feature sequence and the target feature sequence, the system can generate descriptions of complex, diverse, and even implicit visual relationships depicted in the source and target images. A new language-guided image dataset was created to evaluate the description system. This new image dataset includes pairs of digital images in which target images are transformed from corresponding source images by an image editing operation. The description system demonstrated successful performance in generating natural language descriptions of the image editing operations performed to transform the target images from the source images included in the new image dataset.

The described systems and techniques also demonstrate successful performance in generating descriptions of visual relationships between image pairs from several different digital image datasets. The performance of the description system was compared to reported performance of a conventional system on one of the additional image datasets. The description system outperformed the conventional system according to several different metrics on the image dataset for which the conventional system was designed.

Term Descriptions

As used herein, the term "feature map" refers to an output (also called an activation map) of a filter applied to an input image. For example, each feature in the feature map represents a part of the input image. By way of example, a feature map is a mapping of what is depicted in the input image and where it is depicted. For example, a feature map is a mapping corresponding to activation of different parts of the input image and also a mapping of where a particular feature is found in the input image. A high activation corresponds to a finding of the particular feature.

As used herein, the term "feature sequence" refers to a flattened feature map. By way of example, a feature map of size N×N×2048 (where N is the height or width of the feature map) may be flattened into a feature sequence $N^2 \times 2048$.

As used herein, the term "attention" refers to a focus on a subset of inputs. By way of example, an attention function maps a query and a set of key-value pairs to an output. The output is a weighted sum of the values and a weight assigned to each value is computed by a compatibility function of the query with the corresponding key.

As used herein, the term "cross-attention" refers to attention between a first feature sequence and a second feature sequence such that a first-to-second attention takes each feature of the first feature sequence as a query and attends to the features of the second feature sequence and a second-to-first attention takes each feature of the second feature sequence as a query and attends to the features of the first feature sequence.

In the following discussion, an example environment is first described that may employ the techniques described herein. Example procedures are also described which may be performed in the example environment as well as other environments. Consequently, performance of the example procedures is not limited to the example environment and the example environment is not limited to performance of the example procedures.

Example Environment

FIG. 1 is an illustration of an environment 100 in an example implementation that is operable to employ digital systems and techniques as described herein. The illustrated environment 100 includes a computing device 102 connected to a network 104. The computing device 102 may be configured as a desktop computer, a laptop computer, a mobile device (e.g., assuming a handheld configuration such as a tablet or mobile phone), and so forth. Thus, the computing device 102 may range from a full resource device with substantial memory and processor resources (e.g., personal computers, game consoles) to a low-resource device with limited memory and/or processing resources (e.g., mobile devices). Additionally, the computing device 102 may be representative of a plurality of different devices, such as multiple servers utilized by a business to perform operations "over the cloud."

The illustrated environment 100 also includes a display device 106 that is communicatively coupled to the computing device 102 via a wired or a wireless connection. A variety of device configurations may be used to implement the computing device 102 and/or the display device 106. The computing device 102 includes a storage device 108 and a description module 110. The storage device 108 is illustrated to include digital content 112 such as a source digital image 114 and a target digital image 116.

The source digital image 114 and the target digital image 116 are rendered in a user interface 118 of the display device 106 and also included in input data 120. The description module 110 is illustrated as having, receiving, and/or transmitting the input data 120. For example, the computing device 102 may implement the description module 110 to receive the input data 120 which can include the source digital image 114 and the target digital image 116, and the description module 110 can process the input data 120 to generate a description 122 of a visual transformation between the source digital image 114 and the target digital image 116.

As illustrated, the source digital image 114 depicts a road through a field next to a mountain under a cloudy sky. The target digital image 116 also depicts a road through a field next to a mountain under a cloudy sky but the target digital image 116 depicts stars in the sky. The description module 110 processes the input data 120 to determine a visual relationship between the source digital image 114 and the target digital image 116.

In this example, the description module 110 determines that the target digital image 116 is the same as the source digital image 114 with stars added to the sky. Thus, the visual transformation between the source digital image 114 and the target digital image 116 is addition of stars to the sky in the target digital image 116. The description module 110 generates the description 122 of the visual transformation in natural language as "add stars in the sky" and the description module 110 renders the description 122 as text in the user interface 118.

Figure 2:
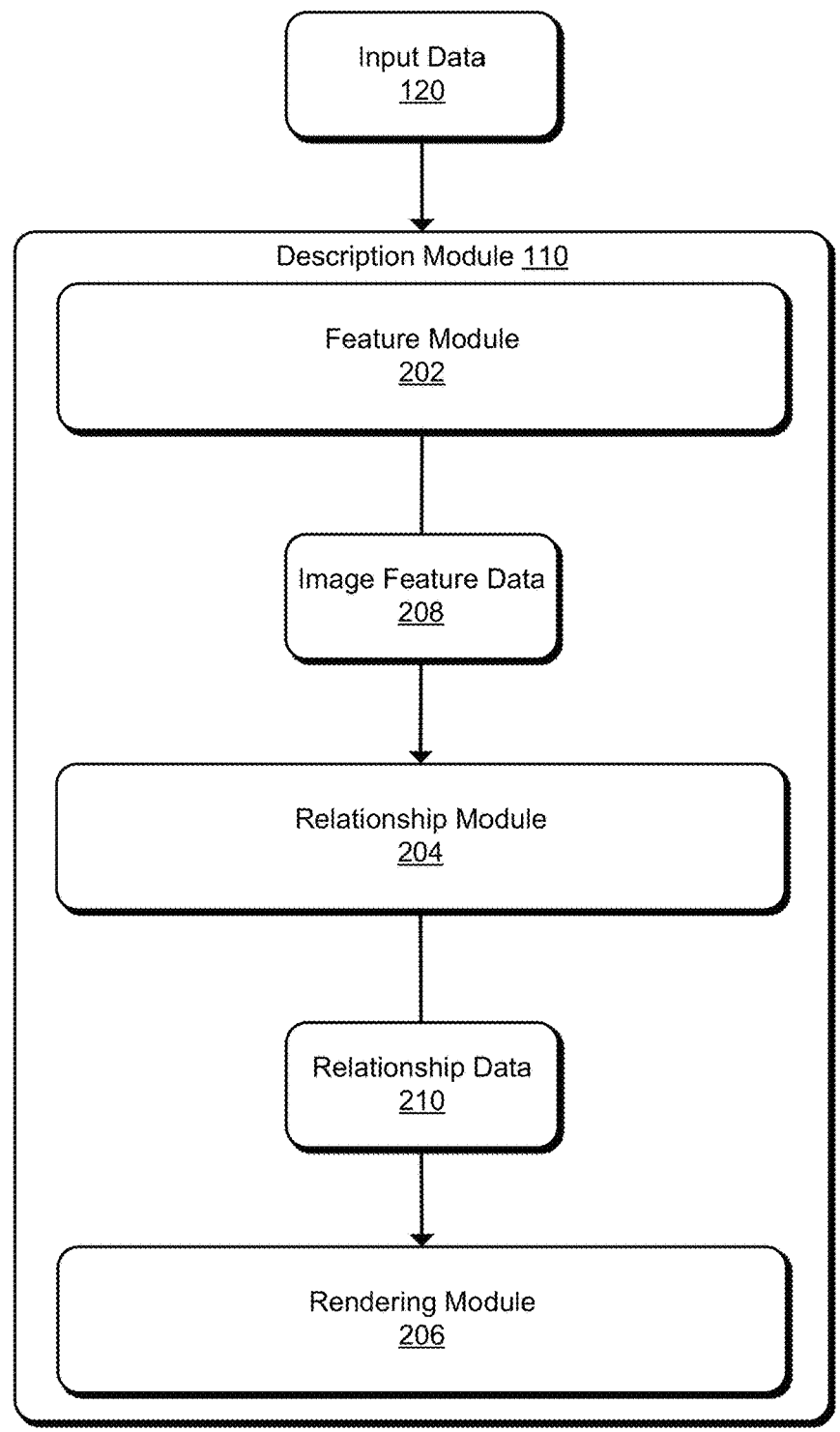
FIG. 2 depicts a system in an example implementation showing operation of a description module.

FIG. 2 depicts a system 200 in an example implementation showing operation of a description module 110. The description module 110 is illustrated to include a feature module 202, a relationship module 204, and a rendering module 206. The computing device 102 implements the description module 110 to receive the input data 120 which describes pairs of digital images such as the source digital image 114 and the target digital image 116.

In one example, the feature module 202 is implemented to receive the input data 120 and process the input data 120 to generate image feature data 208. The feature module 202 can include a convolutional neural network having a residual learning framework such as ResNet-101 which can be used as a feature extractor to encode the source digital image 114 and the target digital image 116. For example, the feature module 202 processes the input data 120 to extract a feature map of the source digital image 114 as a source feature map. In this example, the feature module 202 processes the input data 120 to extract a feature map of the target digital image 116 as a target feature map. In this manner, each feature of the source feature map represents a portion of the source digital image 114 and each feature of the target feature map represents a portion of the target digital image 116. Thus, the source feature map describes what is depicted in the source digital image 114 and where it is depicted in the source digital image 114 while the target feature map describes what is depicted in the target digital image 116 and where it is depicted in the target digital image 116.

In one example, the feature module 202 can extract feature maps of size:

$N \times N \times 2048$ where: N is the height or width of the feature map.

The feature module 202 flattens the feature maps to two feature sequences:

$N^2 \times 2048$ where: $f^{SRC}$ is a feature sequence of the source digital image and $f^{TRG}$ is a feature sequence of the target digital image.

In an example, the feature module 202 concatenates the source feature sequence $f^{SRC}$ and the target feature sequence $f^{TRG}$ into a single feature sequence f such that:

$f^{SRC} = ResNet(I^{SRC})$ $f^{TRG} = ResNet(I^{TRG})$ $f = [f_1^{SRC}, \ldots, f_{N^2}^{SRC}, f_1^{TRG}, \ldots, f_{N^2}^{TRG}]$ where: $I^{SRC}$ is the source digital image and $I^{TRG}$ is the target digital image.

The feature module 202 generates the image feature data 208 to include the feature maps and/or the feature sequences.

The relationship module 204 receives the image feature data 208 and processes the image feature data 208 to generate relationship data 210. The relationship module 204 can include an attentive encoder-decoder model which can include a Long Short-Term Memory (LSTM) decoder.

LSTM networks are a type of recurrent neural network capable of learning order dependence in sequence prediction problems. Unlike standard feedforward neural networks, LSTM networks have feedback connections. A common LSTM unit includes a cell and gates such that the cell remembers values over arbitrary time intervals and the gates regulate flow of information into and out of the cell. In this manner, LSTM networks can maintain a historical context of inputs which makes these networks well suited for tasks involving language and/or digital images.

In one example, the relationship module 204 generates a sentence describing a visual relationship between the source digital image 114 and the target digital image 116. In this example, the sentence may be represented as:

$\{w_1, w_2, \ldots, w_T\}$ where: $\{w_t\}_{t=1}^T$ are word tokens with a total length of T.

The relationship module 204 generates the relationship data 210 as including the sentence. The rendering module 206 receives the relationship data 210 and processes the relationship data 210 to render the description 122 as text in the user interface 118 in one example. Although the feature module 202, the relationship module 204, and the rendering module 206 are described as separate modules, it is to be appreciated that these modules may be implemented as a single module or as including additional modules.

In general, functionality, features, and concepts described in relation to the examples above and below may be employed in the context of the example procedures described in this section. Further, functionality, features, and concepts described in relation to different figures and examples in this document may be interchanged among one another and are not limited to implementation in the context of a particular figure or procedure. Moreover, blocks associated with different representative procedures and corresponding figures herein may be applied together and/or combined in different ways. Thus, individual functionality, features, and concepts described in relation to different example environments, devices, components, figures, and procedures herein may be used in any suitable combinations and are not limited to the particular combinations represented by the enumerated examples in this description.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIG. 1 and FIG. 2.

Figure 3:
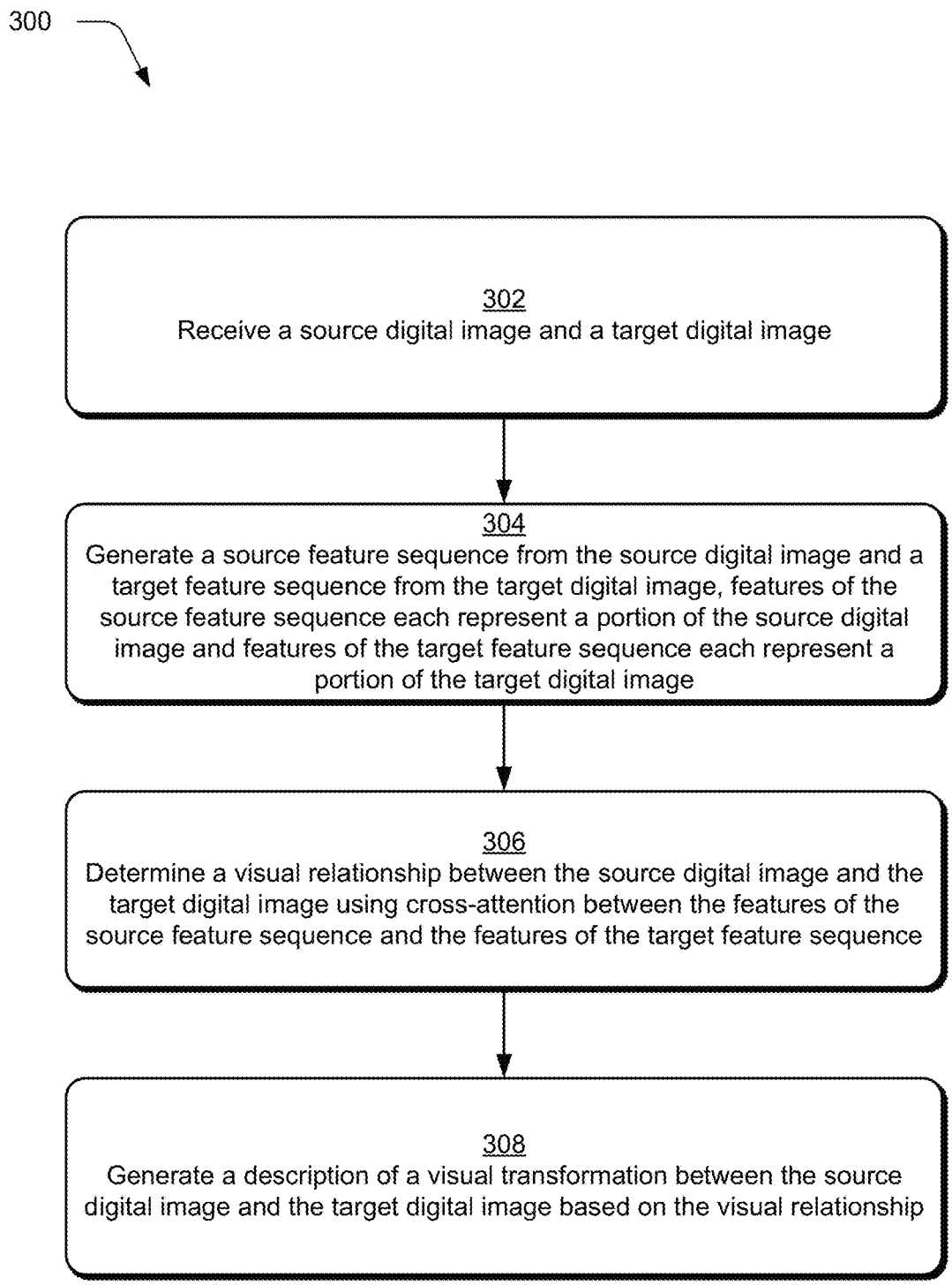
FIG. 3 is a flow diagram depicting a procedure in an example implementation in which a source image and a target image are received and a description of a visual transformation between the source image and the target image is generated.

FIG. 3 is a flow diagram depicting a procedure 300 in an example implementation in which a source digital image and a target digital image are received and a description of a visual transformation between the source digital image and the target digital image is generated. A source digital image and a target digital image are received (block 302). For example, the computing device 102 implements the description module 110 to receive the source digital image and the target digital image. A source feature sequence is generated from the source digital image and a target feature sequence is generated from the target digital image (block 304), features of the source feature sequence each represent a portion of the source digital image and features of the target feature sequence each represent a portion of the target digital image. The description module 110 may generate the source feature sequence and the target feature sequence.

A visual relationship between the source digital image and the target digital image is determined (block 306) using cross-attention between the features of the source feature sequence and the features of the target feature sequence. For example, the description module 110 determines the visual relationship between the source digital image and the target digital image. A description of a visual transformation between the source digital image and the target digital image is generated (block 308) based on the visual relationship. The description module 110 can generate the description of the visual transformation between the source digital image and the target digital image.

Figure 4:
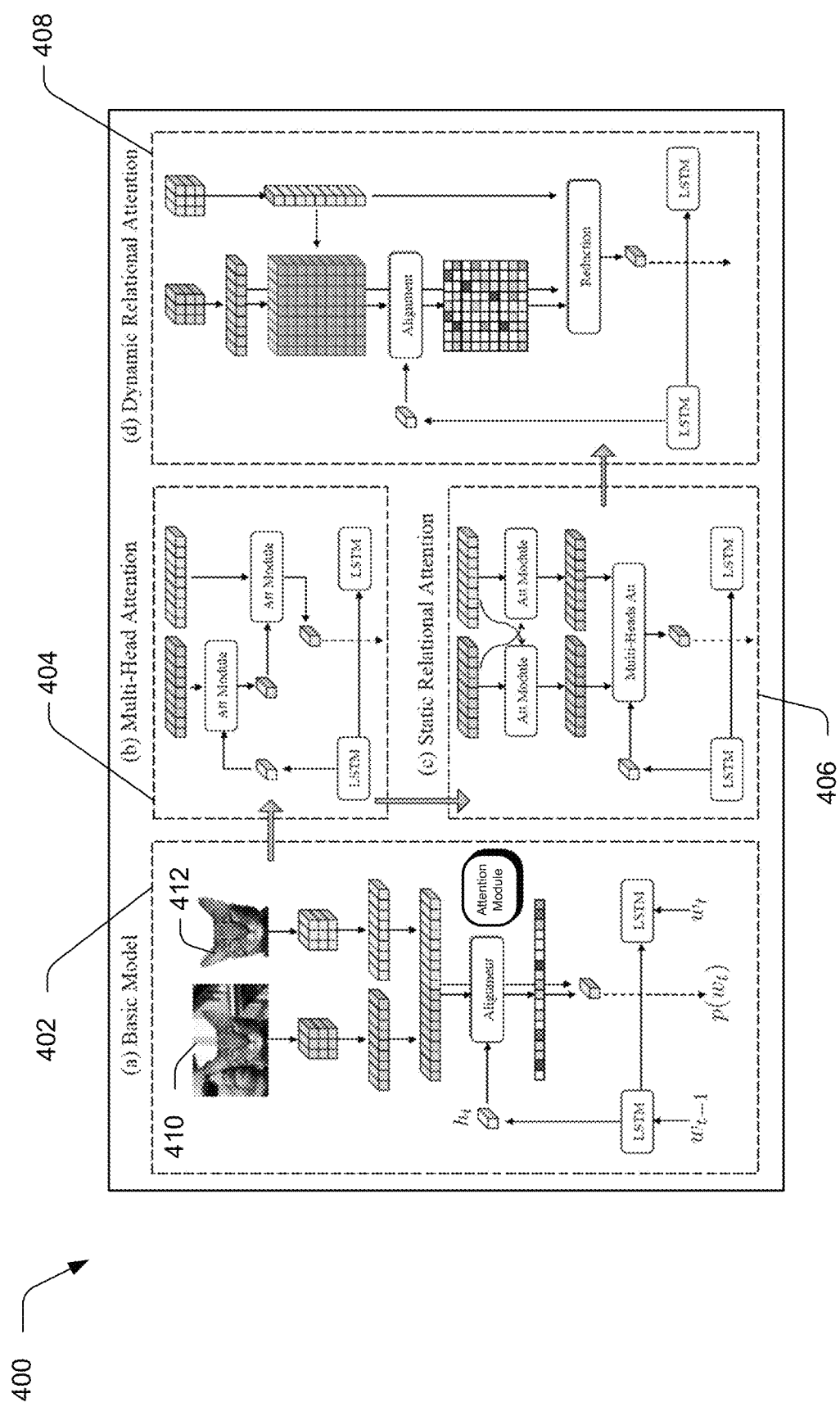
FIG. 4 is an illustration of a representation of example embodiments of a description module.

FIG. 4 is an illustration of a representation 400 of example embodiments of a description module 110. The representation 400 includes a basic model 402 which is an attentive encoder-decoder model in one example. The basic model 402 is enhanced by a multi-head attention module 404 and by a static relational attention module 406. The multi-head attention module 404 enhances the basic model 402 by differentiating between input images. The static relational attention module 406 further enhances the multi-head attention module 404 by examining visual relationships between input images. The representation 400 also includes a dynamic relational attention module 408. The dynamic relational attention module 408 enhances the static relational module 406 by dynamically calculating relational scores while decoding.

As shown, the basic model 402 includes an LSTM decoder and the basic model 402 receives a source digital image 410 and a target digital image 412 as inputs. The basic model 402 can include a convolutional neural network having a residual learning framework such as ResNet-101 which can be used as a feature extractor to encode the source digital image 410 and the target digital image 412. For example, the basic model 402 extracts a source feature map from the source digital image 410 and extracts a target feature map from the target digital image 412. The basic model 402 flattens the feature maps into a source feature sequence $f^{SRC}$ corresponding to the source digital image 410 and a target feature sequence $f^{TRG}$ corresponding to the target digital image 412. The basic model 402 then concatenates the features sequences $f^{SRC}$ and $f^{TRG}$ into a single feature sequence f.

At each decoding step t, an LSTM cell takes an embedding of a previous word $w_{t-1}$ as an input. When training the basic model 402, the word $w_{t-1}$ comes from a ground truth. When using a trained model for evaluation, the word $w_{t-1}$ comes from a token with maximal probability. An attention module of the basic model 402 then attends to the feature sequence f with a hidden output $h_t$ as a query.

Inside of the attention module, alignment scores $\alpha_{t,i}$ are computed between the query $h_t$ and each $f_i$. Next, the feature sequence f is aggregated with a weighted average (with a weight of $\alpha$) to form an image context $\hat{f}$. Lastly, the context $\hat{f}_t$ and hidden vector $h_t$ are merged into an attentive hidden vector $\hat{h}_t$ with a fully-connected layer which may be represented as:

$$\widetilde{w_{t-1}} = \text{embedding}(w_{t-1})$$

$$h_t, c_t = LSTM(\widetilde{w_{t-1}}, h_{t-1}, c_{t-1})$$

$$\alpha_{t,i} = \text{softmax}_i(h_t^T W_{IMG} f_i)$$

$$\hat{f}_t = \sum_i \alpha_{t,i} f_i$$

$$\hat{h}_t = \tanh(W_1[\hat{f}_t; h_t] + b_1)$$

where: $\widetilde{w_{t-1}}$ is a vector such as a 300-dimension vector; $c_t$ is a memory cell of the LSTM network; W is a weight; and b is a bias.

A probability of generating a k-th word token at time step t may be computed as softmax over a linear transformation of the attentive hidden vector $\hat{h}_t$. The loss $\mathcal{L}_t$ is the negative log likelihood of the ground truth word token $w^*_t$:

$$p_t(w_{t,k}) = \text{softmax}_k(W_W \hat{h}_t + b_W)$$

$$\mathcal{L}_t = -\log p_t(w^*_t)$$

where: $p_t(w_{t,k})$ is the probability of generating the k-th word token at time step t; and $\mathcal{L}_t$ is the loss.

In order to enhance the basic model 402 and differentiate between the source digital image 410 and the target digital image 412, the multi-head attention module 404 implements multi-head attention in a sequential manner In particular, when the model is attending to the target digital image 412, contextual information retrieved from the source digital image 410 is available which can be leveraged to perform better at differentiation or relationship learning. To do so, a source attention head first attends to the source feature sequence $f^{SRC}$ corresponding to the source digital image 410. The attention module is the same as in the basic model 402 except that the module only attends to the source digital image:

$$\alpha_{t,i}^{SRC} = (\text{softmax})_i(h_t^T W_{SRC} f_i^{SRC})$$

$$\overline{f_t^{SRC}} = \sum_i \alpha_{t,i}^{SRC} f_i^{SRC}$$

$$\overline{h_t^{SRC}} = \tanh(W_2[\overline{f_t^{SRC}}; h_t] + b_2)$$

where: $\overline{h_t^{SRC}}$ is the output of the source attention; W is a weight; and b is a bias.

A target attention head then takes the output of the source attention $\overline{h_t^{SRC}}$ as a query to retrieve appropriate information from the target feature sequence $f^{TRG}$ corresponding to the target digital image 412:

$$\alpha_{t,j}^{TRG} = (\text{softmax})_i(\overline{h_t^{SRC}} W_{TRG} f_j^{TRG})$$

$$\overline{f_t^{TRG}} = \sum_j \alpha_{t,j}^{SRC} f_j^{TRG}$$

$$\overline{h_t^{TRG}} = \tanh(W_3[\overline{f_t^{TRG}}; \overline{h_t^{SRC}}] + b_3)$$

where: W is a weight and b is a bias.

In place of $\hat{h}_t$, the output of the target head $\overline{h_t^{TRG}}$ is used to predict the next word. Exchanging the order of the source attention head and the target attention head did not produce significantly different results.

In order to explicitly examine visual relationships in addition to learning to differentiate between the source digital image 410 and the target digital image 412, the static relational attention module 406 computes a relational score between the source feature sequence f$^{SRC}$ and the target feature sequence f$^{TRG}$ statically (e.g., not in decoding) and reduces the scores into two relationship aware feature sequences. To do so, bi-directional relational attention is applied: one cross-attention from the source to the target and one cross-attention from the target to the source. For each feature in the source feature sequence f$^{SRC}$, the source-to-target attention computes its alignment with the features in the target feature sequence f$^{TRG}$. The source feature, the attended target feature, and the difference between them are then merged together with a fully-connected layer:

$$\alpha_{i,j}^{S \to T} = (\text{softmax})_i \left( (W_S f_i^{SRC})^T (W_T f_j^{TRG}) \right)$$

$$\overline{f_t^{S \to T}} = \sum_j \alpha_{i,j}^{S \to T} f_j^{TRG}$$

$$\widetilde{f_i^S} = \tanh(W_4 [f_i^{SRC}; \overline{f_t^{S \to T}}]) + b_4$$

where: $W_S$ and $W_T$ are matrices; W is a weight; and b is a bias.

Attention weight is decomposed into matrices $W_S$ and $W_T$ to reduce the number of parameters because the dimensions of an image feature are usually large. The target-to-source cross-attention is built in an opposite manner it takes each target feature $f_j^{TRG}$ as a query, attends to the source feature sequence f$^{SRC}$ and determines an attentive feature $\widetilde{f_i^T}$. The two bi-directional attentive sequences $\widetilde{f_i^S}$ and $\widetilde{f_i^T}$ are then used in the multi-head attention module 404 at each decoding step.

The static relational attention module 406 compresses pairwise relationships of size $N^4$ into two relationship-aware feature sequences of size $2 \times N^2$. This compression reduces use of computational resources but may also result in information loss. In order to avoid losing information, the dynamic relational attention module 408 calculates the relational scores while decoding. At each decoding step t, the dynamic relational attention module 408 calculates an alignment score $a_{t,i,j}$ between three vectors: a source feature $f_i^{SRC}$, a target feature $f_j^{TRG}$ and a hidden state $h_t$. Because the dot-products used in the other modules do not have a direct extension for three vectors, the dot products are extended to compute the three-vector alignment score as follows:

$$\text{dot}(x, y) = \sum_d x_d y_d = x^T y$$

$$\text{dot}^*(x, y, z) = \sum_d x_d y_d z_d = (x \odot y)^T z$$

$$a_{t,i,j} = \text{dot}^*(W_{SK} f_i^{SRC}, W_{TK} f_j^{TRG}, W_{HK} h_t) = (W_{SK} f_i^{SRC} \odot W_{TK} f_j^{TRG})^T W_{HK} h_t$$

where: $\odot$ is element-wise multiplication.

The alignment scores of size $N^4$ are normalized using softmax and the attention information is fused to an attentive hidden vector $\widetilde{f_t^D}$:

$$\alpha_{t,i,j} = \text{softmax}_{i,j}(a_{t,i,j})$$

$$f_t^{\overline{SRC}=D} = \sum_{i,j} \alpha_{t,i,j} f_i^{SRC}$$

$$f_t^{\overline{TRG}=D} = \sum_{i,j} \alpha_{t,i,j} f_j^{TRG}$$

$$\widetilde{f_t^D} = \tanh(W_5 [f_t^{\overline{SRC}=D}; f_t^{\overline{TRG}=D}; h_t] + b_5) =$$
$$\tanh(W_{5S} f_t^{\overline{SRC}=D} + W_{5T} f_t^{\overline{TRG}=D} + W_{5H} h_t + b_5)$$

where: $W_{5S}$, $W_{5T}$, and $W_{5H}$ are sub-matrices of $W_5$ and $W_5 = [W_{5S}, W_{5T}, W_{5H}]$.

From above, an analog in conventional attention layers may have the following specifications:

Query: $h_t$

Key: $W_{SK} f_i^{SRC} \odot W_{TK} f_j^{TRG}$

Value: $W_{5S} f_i^{SRC} + W_{5T} f_j^{TRG}$ where: the key $W_{TK} f_i^{SRC} \odot W_{TK} f_j^{TRG}$ and the value $W_{5S} f_i^{SRC} + W_{5T} f_j^{TRG}$ can be considered as representations of the visual relationships between $f_i^{SRC}$ and $f_j^{TRG}$. In this manner, a direct attention to a visual relationship between the source digital image 410 and the target digital image 412 can be implemented. Therefore, the embodiments of the description module 110 described are suitable for generating relationship descriptions.

Example Datasets

The described systems and techniques have been evaluated on multiple datasets. Dataset 1 is designed to include pairs of digital images in which one image in each pair of digital images is an edited version of the other image in the pair. Candidate pairs of digital images for potential inclusion in Dataset 1 can be identified from social media forums such as those in which digital images are provided along with requests to edit the digital images. Edited digital images provided in response to these requests can be combined with corresponding unedited digital images to form the candidate pairs of digital images.

For example, these candidate pairs of images are collected and human annotated to describe image editing operations performed to generate the edited digital images from the unedited digital images of each candidate pair. The annotated candidate pairs of digital images may then be reviewed by an image editing expert and each annotated candidate pair can be categorized as (1) correct instruction; (2) incomplete instruction; (3) implicit request; or (4) other type or error. In one example, Dataset 1 may only include annotated candidate pairs of digital images of category (1) correct instruction.

Specifically, Dataset 1 includes 3939 pairs of digital images (3061 for training, 383 for validation, and 495 for testing) with 5695 human annotated instructions. Each pair of digital images includes a source digital image and a corresponding target digital image which is an edited version of the source digital image. Each pair in the training set includes one instruction which correctly describes an image editing operation performed on a source digital image to generate a corresponding target digital image.

Each pair of digital images in the validation and testing sets includes three instructions written by three different annotators. Thus, Dataset 1 is a multi-reference dataset which facilitates an increased accuracy in evaluation of generated descriptions of pairs of images using a model trained on Dataset 1 by automatic evaluation metrics. The instructions have an average length of 7.5 words with a standard deviation of 4.8. Excluding words with less than three occurrences, Dataset 1 includes a vocabulary of 786 words.

Dataset 2 includes 13192 digital image pairs. This dataset is designed to generate instructions that can describe visual differences between each pair of digital images. The digital images are from video-surveillance footage and Dataset 2 includes an average of 1.86 captions per digital image pair. The captions are human written and describe differences between each pair of digital images. Dataset 2 is split into training, validation, and testing sets in a corresponding ratio of 8:1:1.

Dataset 3 includes related digital images and human written statements describing the related digital images. This dataset was designed to train models to determine whether a statement about two related digital images correctly describes the visual contents of the images. Dataset 3 was converted from classification task to a generation task by excluding digital image pairs having incorrect descriptions. After this conversion, Dataset 3 includes 51020 digital image pairs and the ratio of training, validation, and testing sets of the original dataset was preserved.

Example Performance Metrics

The basic model 402, the multi-head attention module 404, the static relational attention module 406, and the dynamic relational attention module 408 were separately trained and evaluated on Dataset 1, Dataset 2, and Dataset 3. The evaluation was performed following the "single sentence decoding" experiment of Harsh Jhamtani and Taylor Berg-Kirkpatrick, *Learning to Describe Differences Between Pairs of Similar Images*, Proceedings of the 2018 Conference on Empirical Methods in Natural Language Processing, pages 4024-4034 (2018). The following automated metrics were considered in evaluation: Bilingual Evaluation Understudy 4 (BLEU-4), Consensus-Based Image Description Evaluation (CIDEr), Metric for Evaluation of Translation with Explicit ORdering (METEOR), and Recall-Oriented Understudy for Gisting Evaluation L (ROUGE-L).

TABLE 1

Dataset 1

| Method | BLEU-4 | CIDEr | METEOR | ROUGE-L |
|---|---|---|---|---|
| basic model | 5.04 | 21.58 | 11.58 | 34.66 |
| multi-head attention | 6.13 | 22.82 | 11.76 | 35.13 |
| static relational attention | 5.76 | 20.70 | 12.59 | 35.46 |
| dynamic relational attention | 6.72 | 26.36 | 12.80 | 37.25 |

TABLE 2

Dataset 2

| Method | BLEU-4 | CIDEr | METEOR | ROUGE-L |
|---|---|---|---|---|
| basic model | 5.68 | 22.20 | 10.98 | 24.21 |
| multi-head attention | 7.52 | 31.39 | 11.64 | 26.96 |
| static relational attention | 8.31 | 33.98 | 12.95 | 28.26 |
| dynamic relational attention | 8.09 | 35.25 | 12.20 | 31.38 |
| CAPT Jhamtani 2018 | 7.30 | 26.30 | 10.50 | 25.60 |
| DDLA Jhamtani 2018 | 8.50 | 32.80 | 12.00 | 28.60 |

TABLE 3

Dataset 3

| Method | BLEU-4 | CIDEr | METEOR | ROUGE-L |
|---|---|---|---|---|
| basic model | 5.04 | 43.39 | 10.82 | 22.19 |
| multi-head attention | 5.11 | 44.80 | 10.72 | 22.60 |
| static relational attention | 4.95 | 45.67 | 10.89 | 28.26 |
| dynamic relational attention | 5.00 | 46.41 | 10.37 | 31.38 |

As shown in Table 2, the described systems demonstrate improved results of Jhamtani 2018 which was performed on Dataset 2. Improvements are demonstrated in all metrics considered other than BLEU-4. The Difference Description with Latent Alignment (DDLA) method of Jhamtani 2018 learns alignments between descriptions and visual differences and relies on the particular nature of Dataset 2. Thus, the DDLA method could not be easily transferred other datasets in which a visual relationship is not obvious. The data presented in Tables 1-3 establishes that the description module 110 is not dataset dependent and performs well across all three datasets considered. Thus, the description module 110 is an improvement relative to the DDLA method.

TABLE 4

Human Evaluation

| Dataset | basic model | dynamic relational attention | Both good | Both not |
|---|---|---|---|---|
| Dataset 1 | 11 | 24 | 5 | 60 |
| Dataset 2 | 22 | 37 | 6 | 35 |
| Dataset 3 | 24 | 37 | 17 | 22 |

Table 4 presents results of a human evaluation of 100 randomly selected samples of digital image pairs from the testing set of each dataset. The participants were asked to select a better description between a description generated by the basic model 402 and a description generated by the dynamic relational attention module 408, or alternatively to indicate that the two generated descriptions were equal in quality. As shown in Table 4, the dynamic relational attention module 408 outperformed the basic model 402 in all three datasets.

Figure 5:
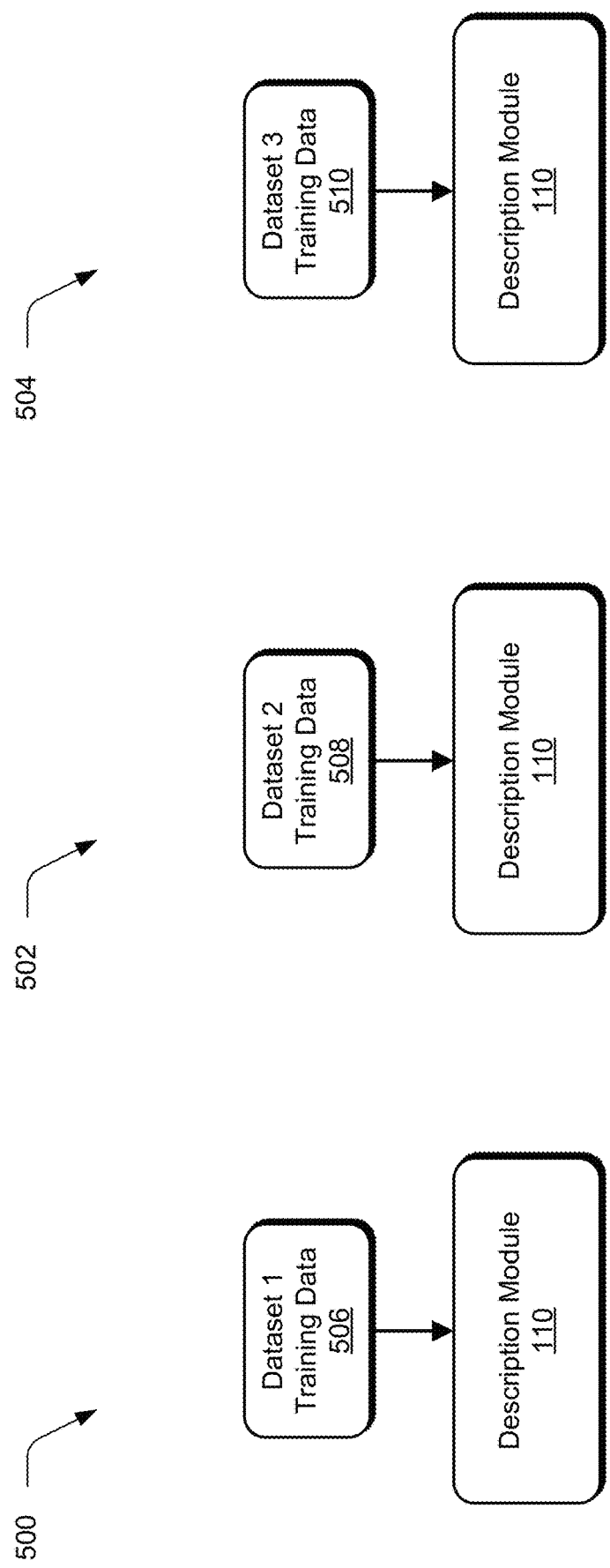
FIG. 5 is an illustration of representations of examples of training a description module.

FIG. 5 is an illustration of representations 500-504 of examples of training a description module 110. Representation 500 illustrates the description module 110 trained using Dataset 1 training data 506. Representation 502 illustrates the description module 110 trained using Dataset 2 training data 508. Representation 504 illustrates the description module 110 trained using Dataset 3 training data 510. As shown, the description module 110 is separately trained on the training datasets 506-510.

Figure 6:
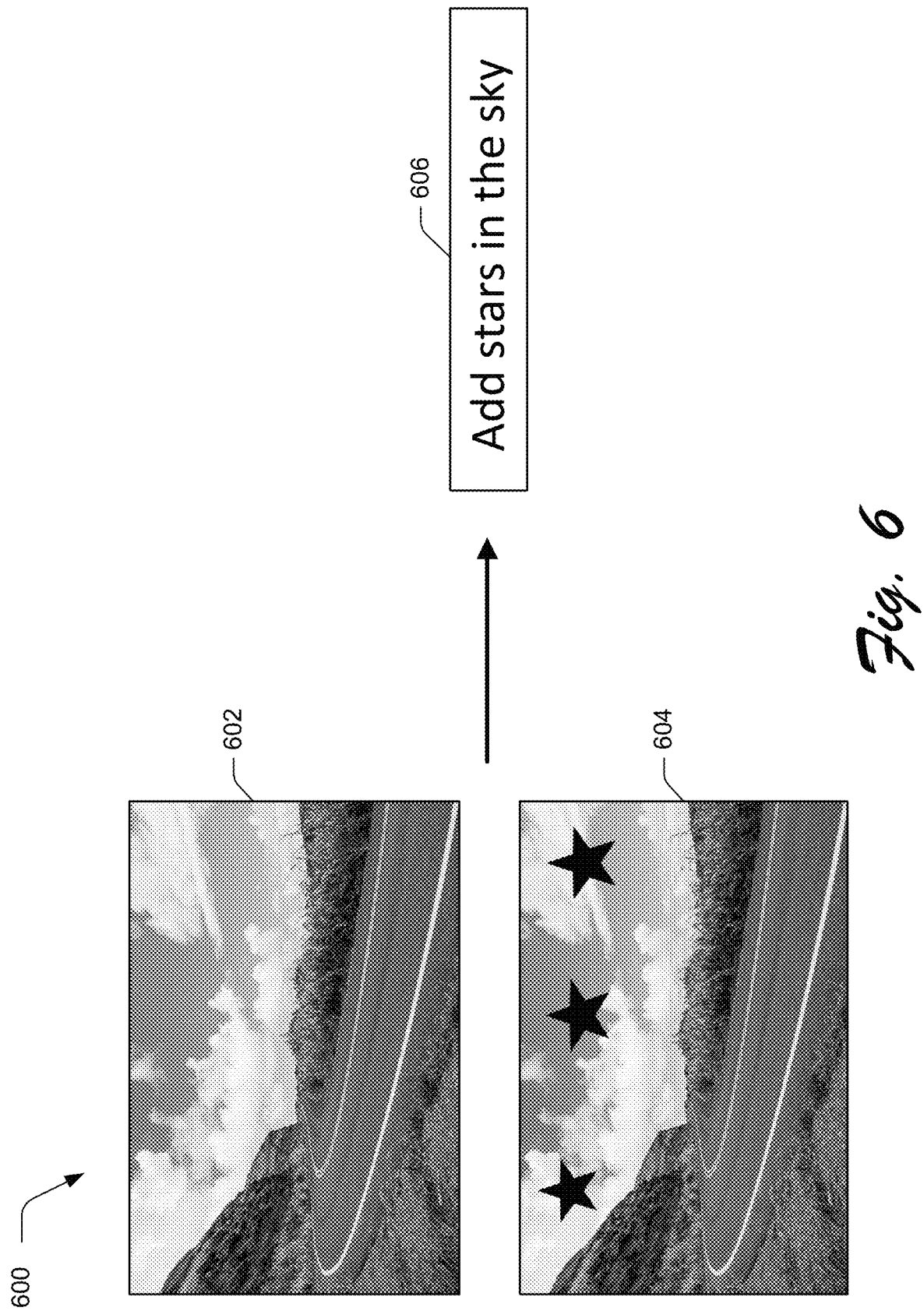
FIG. 6 is an illustration of a representation of generating a description of a visual transformation between a source image and a target image.

FIG. 6 is an illustration of a representation 600 of generating a description of a visual transformation between a source digital image and a target digital image. The representation 600 includes a source digital image 602 and a target digital image 604. The source digital image 602 depicts a road through a field next to a mountain under a cloudy sky. The target digital image 604 also depicts a road through a field next to a mountain under a cloudy sky but the target digital image 604 depicts stars in the sky.

As illustrated in this example, the visual transformation between the source digital image 602 and the target digital image 604 is an image editing operation in which the stars are added in the sky of the source digital image 602 to generate the target digital image 604. Thus, the target digital image 604 includes an object (the stars) which is excluded from the source digital image 602. The computing device 102 implements the description module 110 to generate a description 606 of the visual transformation between the source digital image 602 and the target digital image 604.

The description module 110 extracts a source feature map from the source digital image 602 and a target feature map from the target digital image 604. The description module 110 flattens the source and target feature maps into source and target features sequences, respectively. Thus, each feature of the source feature sequence represents a portion of the source digital image 602 and each feature of the target feature sequence represents a portion of the target digital image 604. The description module 110 uses cross-attention between the source and target feature sequences to generate the description 606 of the visual transformation between the source digital image 602 and the target digital image 604. In this example, the description module 110 generates the description 606 in natural language as "add stars in the sky."

Figure 7:
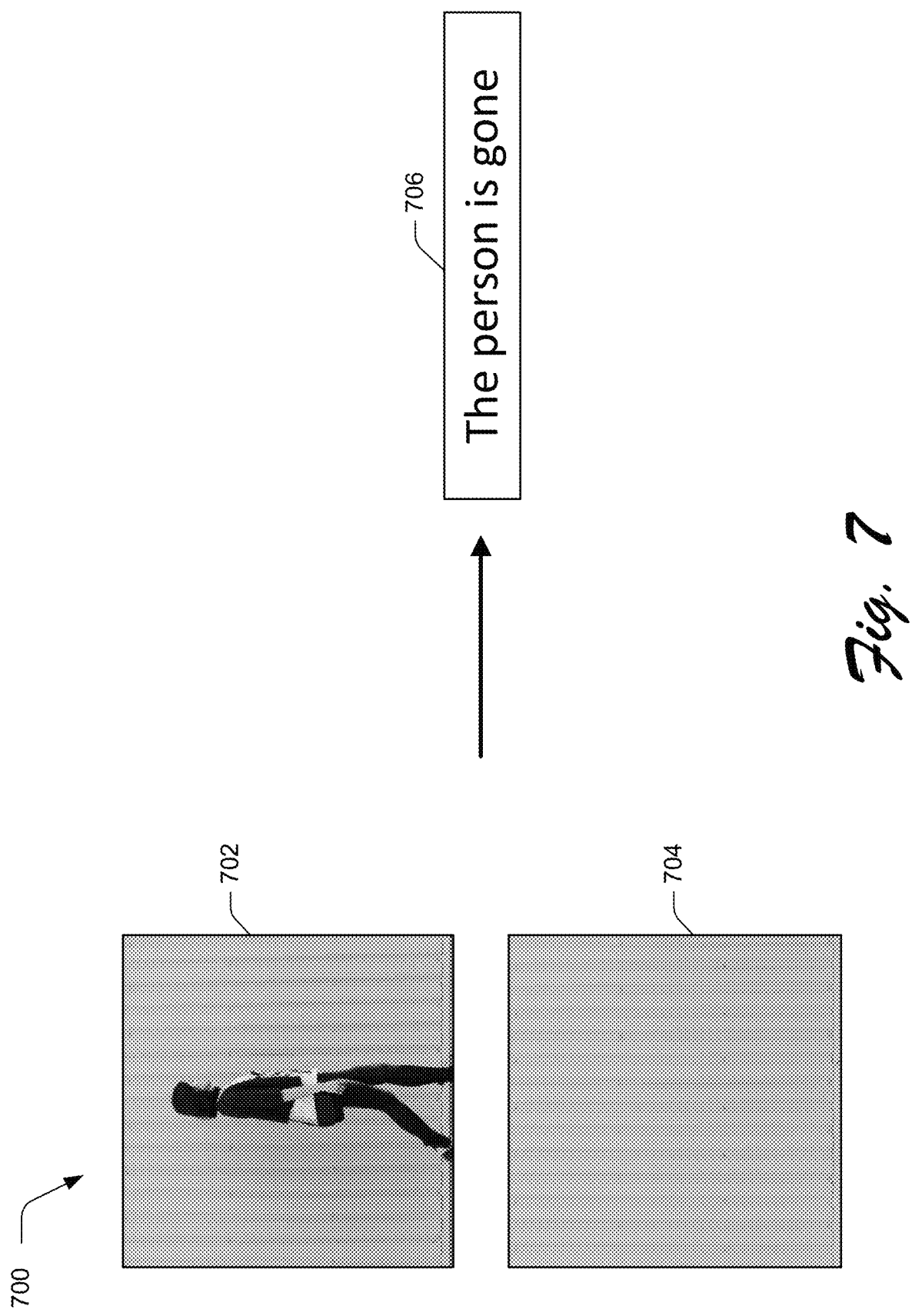
FIG. 7 is an illustration of a representation of generating a description of a difference between a source image and a target image.

FIG. 7 is an illustration of a representation 700 of generating a description of a difference between a source digital image and a target digital image. The representation 700 includes a source digital image 702 and a target digital image 704. The source digital image 702 depicts a woman walking in front of a wall with vertical lines. The target digital image 704 depicts a wall with vertical lines. In this example, the target digital image 704 excludes an object (the woman) which is included in the source digital image 702. The description module 110 is implemented to generate a description 706 of the difference between the source digital image 702 and the target digital image 704.

To do so, the description module 110 extracts a source feature map from the source digital image 702 and a target feature map from the target digital image 704. The description module 110 flattens the source and target feature maps into source and target feature sequences. In this manner, each feature of the source feature sequence represents a portion of the source digital image 702 and each feature of the target feature sequence represents a portion of the target digital image 704. The description module 110 uses cross-attention between the source and target feature sequences to generate the description 706 of the difference between the source digital image 702 and the target digital image 704. As shown in this example, the description module 110 generates the description 706 in natural language as "the person is gone."

Figure 8:
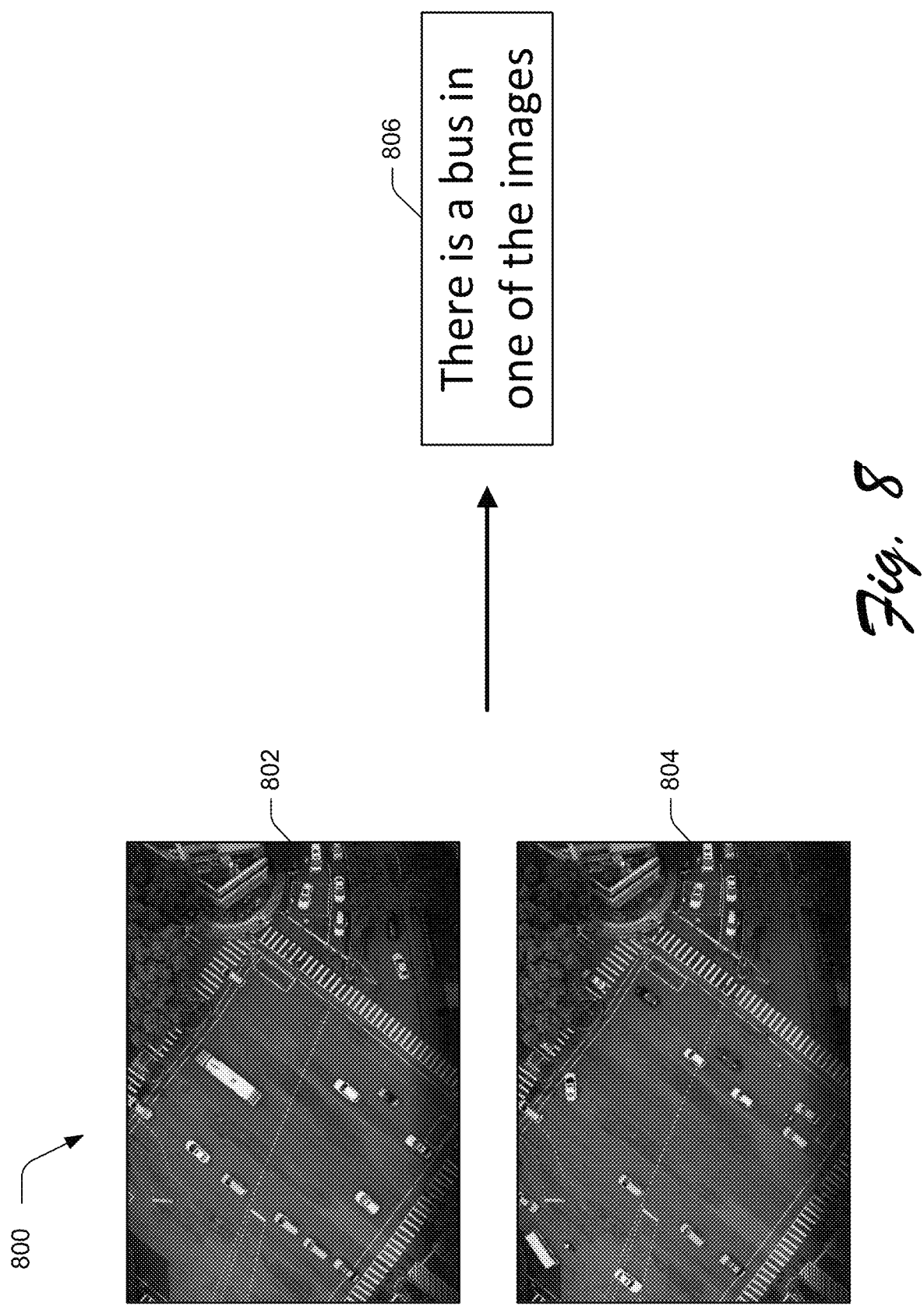
FIG. 8 is an illustration of a representation of generating a caption describing a source image or a target image.

FIG. 8 is an illustration of a representation 800 of generating a caption describing a source digital image or a target digital image. The representation 800 includes a source digital image 802 and a target digital image 804. The source digital image 802 depicts cars and a bus in an intersection. The target digital image 804 depicts cars and a bus in an intersection. For example, the source digital image 802 depicts an environment scene (the intersection) at a first point in time and the target digital image 804 depicts the environment scene at a second point in time. The computing device 102 implements the description module 110 to generate a caption 806 describing the source digital image 802 or the target digital image 804.

The description module 110 extracts a source feature map from the source digital image 802 and a target feature map from the target digital image 804. The description module flattens the source and target feature maps into source and target feature sequences, respectively. Thus, each feature in the source feature sequence represents a portion of the source digital image 802 and each feature of the target feature sequence represents a portion of the target digital image 804. The description module 110 uses cross-attention between the source and target feature sequences to generate the caption 806 describing the source digital image 802 or the target digital image 804. As shown, the description module 110 generates the caption 806 in natural language as "there is a bus in one of the images."

Example System and Device

Figure 9:
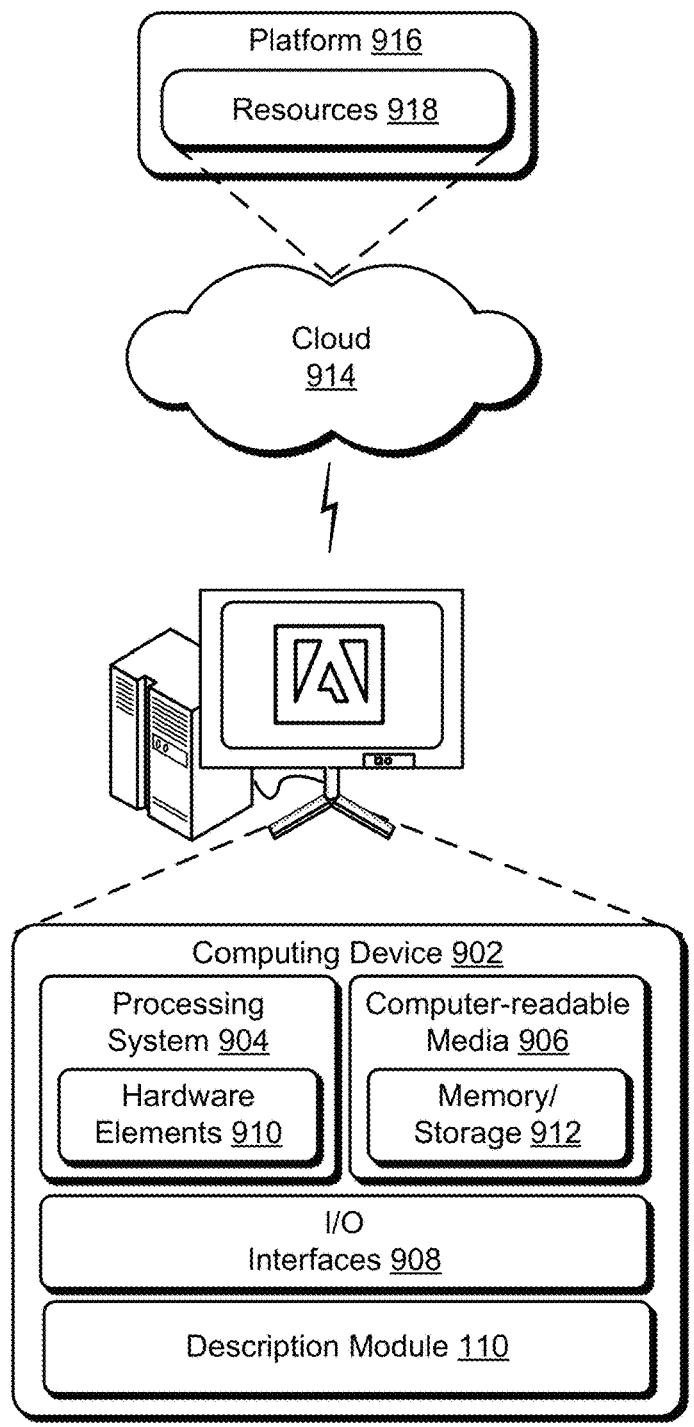
FIG. 9 illustrates an example system that includes an example computing device that is representative of one or more computing systems and/or devices that may implement the various techniques described herein.

FIG. 9 illustrates an example system 900 that includes an example computing device that is representative of one or more computing systems and/or devices that may implement the various techniques described herein. This is illustrated through inclusion of the description module 110. The computing device 902 may be, for example, a server of a service provider, a device associated with a client (e.g., a client device), an on-chip system, and/or any other suitable computing device or computing system.

The example computing device 902 as illustrated includes a processing system 904, one or more computer-readable media 906, and one or more I/O interfaces 908 that are communicatively coupled, one to another. Although not shown, the computing device 902 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 904 is representative of functionality to perform one or more operations using hardware. Accordingly, the processing system 904 is illustrated as including hardware elements 910 that may be configured as processors, functional blocks, and so forth. This may include implementation in hardware as an application specific integrated circuit or other logic device formed using one or more semiconductors. The hardware elements 910 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable media 906 is illustrated as including memory/storage 912. The memory/storage 912 represents memory/storage capacity associated with one or more computer-readable media. The memory/storage component 912 may include volatile media (such as random access memory (RAM)) and/or nonvolatile media (such as read only memory (ROM), Flash memory, optical disks, magnetic disks, and so forth). The memory/storage component 912 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 908 are representative of functionality to allow a user to enter commands and information to computing device 902, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 902 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 902. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 902, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 910 and computer-readable media 906 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 910. The computing device 902 may be configured to implement particular instructions and/or functions corresponding to the software and/or hardware modules. Accordingly, implementation of a module that is executable by the computing device 902 as software may be achieved at least partially in hardware, e.g., through use of computer-readable storage media and/or hardware elements 910 of the processing system 904. The instructions and/or functions may be executable/operable by one or more articles of manufacture (for example, one or more computing devices 902 and/or processing systems 904) to implement techniques, modules, and examples described herein.

The techniques described herein may be supported by various configurations of the computing device 902 and are not limited to the specific examples of the techniques described herein. This functionality may also be implemented all or in part through use of a distributed system, such as over a "cloud" 914 as described below.

The cloud 914 includes and/or is representative of a platform 916 for resources 918. The platform 916 abstracts underlying functionality of hardware (e.g., servers) and software resources of the cloud 914. The resources 918 may include applications and/or data that can be utilized while computer processing is executed on servers that are remote from the computing device 902. Resources 918 can also include services provided over the Internet and/or through a subscriber network, such as a cellular or Wi-Fi network.

The platform 916 may abstract resources 918 and functions to connect the computing device 902 with other computing devices. The platform may also serve to abstract scaling of resources to provide a corresponding level of scale to encountered demand for the resources that are implemented via the platform. Accordingly, in an interconnected device embodiment, implementation of functionality described herein may be distributed throughout the system 900. For example, the functionality may be implemented in part on the computing device 902 as well as via the platform 916 that abstracts the functionality of the cloud 914.

Conclusion

Although implementations of generating descriptions of image relationships have been described in language specific to structural features and/or methods, it is to be understood that the appended claims are not necessarily limited to the specific features or methods described. Rather, the specific features and methods are disclosed as example implementations of generating descriptions of image relationships, and other equivalent features and methods are intended to be within the scope of the appended claims. Further, various different examples are described and it is to be appreciated that each described example can be implemented independently or in connection with one or more other described examples.

What is claimed is:

1. In a digital medium environment to generate a description of a visual transformation between a source digital image and a target digital image, a method implemented by a computing device, the method comprising:
   receiving, by the computing device, the source digital image and the target digital image;
   generating, by the computing device, a source feature sequence from the source digital image and a target feature sequence from the target digital image, features of the source feature sequence each represent a portion of the source digital image and features of the target feature sequence each represent a portion of the target digital image;
   determining, by the computing device, a visual relationship between the source digital image and the target digital image using cross-attention between the features of the source feature sequence and the features of the target feature sequence; and
   generating, by the computing device for display in a user interface, the description of the visual transformation based on the visual relationship as including a difference between an environment scene at a first point in time and the environment scene at a second point in time.

2. The method as described in claim 1, wherein the description of the visual transformation is generated as text.

3. The method as described in claim 1, wherein the visual transformation includes an image editing operation.

4. The method as described in claim 1, further comprising captioning the source digital image and the target digital image with the description of the visual transformation.

5. The method as described in claim 1, wherein the description of the visual transformation includes a natural language image editing instruction.

6. The method as described in claim 1, wherein the description of the visual transformation includes a description of objects depicted in the source digital image or the target digital image.

7. The method as described in claim 1, wherein the target digital image includes an object that is excluded from the source digital image.

8. The method as described in claim 1, wherein the target digital image excludes an object that is included in the source digital image.

9. The method as described in claim 1, wherein determining the visual relationship between the source digital image and the target digital image includes concatenating the source feature sequence and the target feature sequence into a single feature sequence.

10. In a digital medium environment to generate a description of a visual transformation between a source digital image and a target digital image, a system comprising:
    a feature module implemented at least partially in hardware of a computing device to:
      receive the source digital image and the target digital image; and
      generate a source feature sequence from the source digital image and a target feature sequence from the target digital image, features of the source feature sequence each represent a portion of the source digital image and features of the target feature sequence each represent a portion of the target digital image;
    a relationship module implemented at least partially in the hardware of the computing device to determine a visual relationship between the source digital image and the target digital image using cross-attention between the features of the source feature sequence and the features of the target feature sequence; and
    a rendering module implemented at least partially in the hardware of the computing device to generate, for display in a user interface of a display device, the description of the visual transformation based on the visual relationship as including a difference between an environment scene at a first point in time and the environment scene at a second point in time.

11. The system as described in claim 10, wherein the visual transformation includes an image editing operation.

12. The system as described in claim 10, wherein the description of the visual transformation includes a natural language image editing instruction.

13. The system as described in claim 10, wherein the description of the visual transformation includes a description of an object depicted in the source digital image or the target digital image.

14. The system as described in claim 10, wherein the relationship module includes a Long Short-Term Memory (LSTM) decoder.

15. One or more non-transitory computer-readable storage media comprising instructions stored thereon that, responsive to execution by a computing device in a digital medium environment to generate a description of a visual transformation between a source digital image and a target digital image, cause operations of the computing device including:
    generating a source feature sequence from a source feature map extracted from the source digital image and generating a target feature sequence from a target feature map extracted from the target digital image, features of the source feature sequence each represent a portion of the source digital image and features of the target feature sequence each represent a portion of the target digital image;
    determining a visual relationship between the source digital image and the target digital image using cross-attention between the features of the source feature sequence and the features of the target feature sequence and cross-attention between the features of the target feature sequence and the features of the source feature sequence; and
    generating, for display in a user interface of a display device, the description of the visual transformation based on the visual relationship as including a difference between an environment scene at a first point in time and the environment scene at a second point in time.

16. The one or more non-transitory computer-readable storage media as described in claim 15, the operations of the computing device further including captioning the source digital image and the target digital image with the description of the visual transformation.

17. The one or more non-transitory computer-readable storage media as described in claim 15, wherein the description of the visual transformation includes an image editing instruction.

18. The one or more non-transitory computer-readable storage media as described in claim 15, wherein the description of the visual transformation includes a description of an object depicted in the source digital image or the target digital image.

19. The one or more non-transitory computer-readable storage media as described in claim 15, wherein the target digital image includes an object that is excluded from the source digital image.

20. The one or more non-transitory computer-readable storage media as described in claim 15, wherein the target digital image excludes an object that is included in the source digital image.

* * * * *